United States Patent [19]

Thorssell

[11] 4,203,323

[45] May 20, 1980

[54] FLOWMETERING METHOD AND DEVICE

[75] Inventor: Olof L. Thorssell, Hallstahammar, Sweden

[73] Assignee: Bulten-Kanthal AB, Hallstahammar, Sweden

[21] Appl. No.: 962,889

[22] Filed: Nov. 22, 1978

[30] Foreign Application Priority Data

Nov. 23, 1977 [SE] Sweden .................................. 7713241

[51] Int. Cl.² ............................................... G01F 3/00
[52] U.S. Cl. ..................................... 73/194 E; 73/255
[58] Field of Search ................ 73/194 E, 194 C, 229, 73/253, 255; 235/92 FL; 364/510, 484

[56] References Cited

U.S. PATENT DOCUMENTS

| | | | |
|---|---|---|---|
| 3,861,210 | 1/1975 | Griverus | 73/194 |
| 3,965,341 | 1/1976 | Honey | 73/194 |
| 3,978,727 | 9/1976 | Griverus | 73/194 |
| 4,061,030 | 12/1977 | Griverus | 73/194 |

Primary Examiner—Herbert Goldstein
Attorney, Agent, or Firm—Hill, Van Santen, Steadman, Chiara & Simpson

[57] ABSTRACT

In a flowmeter system in which a fluid stream causes a ball to circulate in a guide track at a speed proportional to the volume flow rate of the stream, a signal is produced each time the ball passes a sensing point. The speed of the ball is continually measured, and from stored data representing the fluid volume passing through the flowmeter per signal as a function of the signal repetition rate, the volume associated with each signal is determined. The volumes thus determined during a given period are summed to give the total volume over the given period.

4 Claims, 2 Drawing Figures

FLOWMETERING METHOD AND DEVICE

BACKGROUND OF THE INVENTION

1. Field of the Invention

This invention relates to a method and a device for the volumetric measurement of a fluid stream in a conduit, using a flowmeter of the type having a follower element driven by the fluid stream and performing an orbital movement at a speed proportional to the volume flow rate of the fluid stream.

2. Prior Art

An example of a flowmeter of this type is shown in U.S. Pat. No. 3,861,210. This flowmeter has a generally circular housing with a tangential inlet and an axial outlet. Within the housing there is a ball-shaped follower element which is driven by the fluid stream along a circular orbital path concentric with the outlet. During each completed orbital cycle the ball passes at least one sensing point having, for example, photoelectric or inductive sensors producing signals in response to the ball's passing the sensing point, which signals are detected and processed. The frequency at which the ball passes the sensing point, and thus the frequency or repetition rate of the signals, is proportional to the volume flow rate of the stream, and knowing the fluid volume that flows through the housing for each signal—this volume is hereinafter termed "incremental volume"—one can thus determine the volume flow rate from the repetition rate of the signals. Accordingly, the total fluid volume that flows through the housing during a measuring period can be determined either by multiplying the number of signals detected during the measuring period by the incremental volume or by multiplying the volume flow rate by the length of the measuring period.

A condition that has to be met in order that a correct value of the total volume may be obtained with varying values of the volume flow rate is that there is a direct and linear proportionality of the volume flow rate to the repetition rate at least over the range within which the volume flow rate varies or, in other words, that the incremental volume is independent of variations of the volume flow rate. In actual practice, however, this condition is not met, and particularly with low volume flow rates the deviation from the direct and linear proportionality may be substantial. In cases where great accuracy is required, a correction has therefore to be made.

In accordance with a known method for such correction of volume determination made by multiplying the volume flow rate by the repetition rate, a constant correction is added to the measured value of the repetition rate and the volume determination is then effected using the total value of the repetition rate thus obtained (U.S. Pat. No. 3,978,727). This method of correction does not always produce a sufficiently accurate correction, however, since it does not take into account the nonlinearity of the function representing the repetition rate versus the volume flow rate.

SUMMARY OF THE INVENTION

The present invention eliminates the need for correction. This is achieved by—instead of multiplying either the number of signals by the incremental volume or multiplying the volume flow rate by the duration of the measuring period—continually measuring the repetition rate throughout the measuring period, determining from stored data representing the volume of fluid flowing past the measuring point per signal as a function of the repetition rate the incremental volume associated with each signal, and summing the incremental volumes associated with the signals detected during the measuring period.

In accordance with the invention, the correct value of the total volume is thus determined directly by summing the varying numerical values of the incremental volume, rather than by a multiplication in which one of the factors is or includes an uncorrected or, at best, incompletely corrected numerical value of the repetition rate or the incremental volume.

In realizing the invention, a computer, such as a microcomputer, is advantageously used for the continual computation of the repetition rate of the signals and the determination of the incremental volume of each signal, and of course also for the summing of the various values of the incremental volume. The memory of the computer stores the known nonlinear relationship of the incremental volume to the repetition rate in suitable form. Making use of information of the time elapsed between each signal and the next preceding signal, the computer first calculates the repetition rate corresponding to that time—in practice equivalent to the current speed of the follower element—and then determines what numerical value of the incremental volume that particular repetition rate is associated with, and finally accumulates the determined value. To that value are then successively added the correspondingly determined values associated with the succeeding signals during the measuring period.

For a fuller understanding reference may be had to the following description of the preferred embodiment illustrated on the accompanying drawing.

ON THE DRAWING

AS SHOWN ON THE DRAWING

Figure 1:
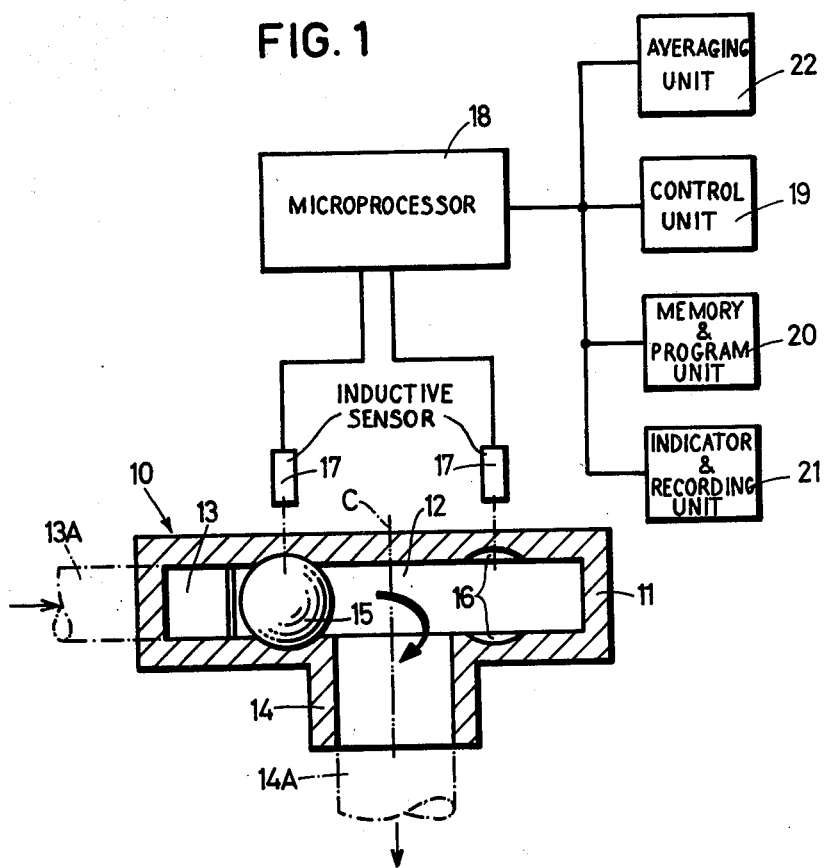
FIG. 1 is a diagrammatic representation, partly in section, of a flowmeter system embodying the invention.

The flowmeter 10 shown in FIG. 1 is of the type shown in U.S. Pat. No. 3,861,210, which is incorporated herein by reference, and comprises a housing 11 which is generally circular in plan view. The housing 11 defines a flow-through compartment 12 having a tangential inlet 13 and an axial outlet 14 adapted to be connected to respective portions 13A and 14A of a conduit conveying the fluid stream to be measured. Within the flow-through compartment 12 there is a follower element formed by a metal ball 15 running in a circular guide track which is concentric with the axial outlet 14. The guide track is defined by a pair of annular confronting grooves 16 in opposed walls of the compartment 12. When a liquid or other fluid stream flows from the inlet 13 through the compartment 12 to the outlet 14, the stream causes the ball 15 to circulate around the guide track at a speed proportional to the volume flow rate of the stream.

On one side of the housing 11, two inductive sensors 17 are provided which are aligned with the guide track grooves 16 and separated circumferentially from one another by 180 degrees, that is, they are disposed in a common axial plane containing the axis C of the guide track and the outlet 14. The two sensors 17, the locations of which form two sensing points along the guide track, are connected to a microcomputer system comprising a microprocessor 18, a control unit 19, a memory and program unit 20, and an indicator and recording unit 21. The microcomputer is constructed in well-known manner from well-known units and therefore need not be described in great detail.

Each time the ball 15 passes a sensor 17, the sensor produces a signal, herein termed passage signal, which is detected and processed by the microcomputer system. The time separating consecutive passage signals, i.e. the time it takes for the ball 15 to move from one sensing point to the next, is continually measured and from this time the microcomputer system continually computes the repetition rate of the passage signal; in this case, where two sensors are provided, the repetition rate is twice the rotational or orbital speed of the ball.

Figure 2:
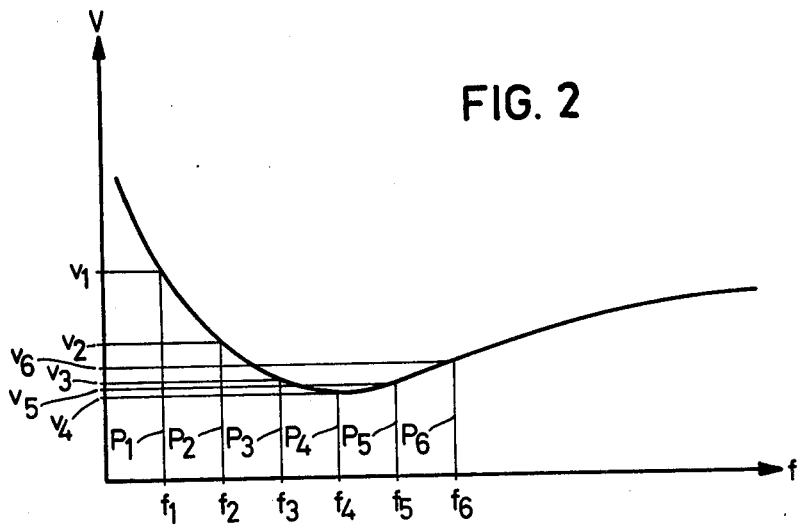
FIG. 2 is a diagram showing a typical relationship of the incremental volume to the signal repetition rate.

FIG. 2 shows a characteristic curve which is typical for flowmeters of the type shown in FIG. 1 and also for certain other types of flowmeters having a follower element driven by the fluid stream so as to perform a rotational or circulating movement at a speed proportional to the volume flow rate of the fluid stream, such as propeller or turbine flowmeters. This characteristic curve shows the incremental volume V—in this case the fluid volume flowing through the housing 11 during the time it takes for the ball 15 to move through one-half of a full turn—as a function of the repetition rate f of the passage signals.

As shown by FIG. 2, the incremental volume is relatively large at low repetition rates of the passage signals, i.e. at low speeds of the ball. The incremental volume initially is reduced sharply as the repetition rate is increased, then levels off to a minimum and finally increases slowly and approaches an asymptote.

FIG. 2 shows that the measuring error that results from the nonlinearity when the measurement is made in accordance with the known methods is particularly large at low repetition rates, that is, the repetition rates existing in connection with the commencement and the termination of a metering operation. When the flowmeter is used for metering out small volumes, the measuring error is particularly significant.

The measuring error that previously resulted from the nonlinearity is eliminated through the present invention which thus permits accurate metering even of small volumes.

In FIG. 2 a series of vertical lines designated $P_1, P_2 \ldots P_6$ represent a number of consecutive passages of the ball 15 past the sensing points at the sensors 17. The corresponding passage signal repetition rates are designated $f_1, f_2 \ldots f_6$, and the incremental volumes associated with these passage signal repetition rates are designated $v_1, v_2 \ldots v_6$. The six consecutive passages represented in FIG. 2 may be considered to constitute the commencement and termination phases of a metering operation which also comprises a longer or shorter intermediate phase in which the passage signal repetition rate f and the incremental volume V may be constant, e.g. equal to respectively $f_6$ and $v_6$.

The fluid volume flowing through the housing 11 during the commencement phase is equal to $v_1 + v_2 \ldots + v_6$. A corresponding volume flows through the housing during the termination phase. The volume flowing through the housing during the intermediate phase is equal to the sum of the constant or varying incremental volumes determined during that phase.

The relationship of the incremental volume V to the passage signal repetition rate f shown in FIG. 2 is stored in suitable form in the memory and program unit 20 of the microcomputer system, and every time the ball 15 passes a sensing point at the sensors 17, the microprocessor 18 determines what value of the incremental volume V is associated with the passage signal repetition rate f computed for that particular passage, and the incremental volume value thus determined is added to any previously determined values.

In the embodiment shown and described by way of example, there are two sensors 17 and consequently two sensing points. One of the two sensing points may be omitted so that the repetition rate is equal to the rotational or orbital speed of the ball 15. Similarly, more than two sensing points may be used so that a correspondingly higher "resolving power" may be achieved. A similar effect may be obtained with a single sensing point in the case of a propeller or turbine flowmeter if two or more propeller or turbine blades are caused to give rise to a passage signal when they pass the sensing point. It is also within the scope of the invention to sense the movements of the follower element past the sensing point at intervals corresponding to two or more complete turns of the follower element. Doing so may be advantageous in cases in which the incremental volume varies only slowly wth changes of the repetition rate so that even the longer sensing intervals result in a sufficiently accurate determination.

In accordance with one embodiment of the invention the continual determination of the repetition rate of the passage signals is carried out using an average value of the time elapsing between consecutive passage signals, herein termed the passage time. The average value is calculated in each instance from the passage times associated with a predetermined number of the immediately preceding passage signals, or, in other words, over a period comprising a predetermined number of the immediately preceding passage signals. Thus, the sum of the passage times associated with the ten most recent passage signals is stored in an averaging unit 22 of the microcomputer system, and for each new passage signal that is produced the passage time associated therewith is added to the stored sum, while the passage time associated with the passage signal first produced is subtracted.

The averaging unit 22 may be a separate unit or it may be incorporated in the microprocessor 18. The determination of the repetition rate of the passage signal may be carried out for each passage signal, thus once or several times per completed turn of the follower element, or at intervals corresponding to more than one complete turn.

The determination of the repetition rate using an average value of the passage time as described reduces the undesired influence on the measuring result caused by any accidental errors in the continual determination of the repetition rate.

It is of course within the scope of the invention to apply different determination modes during different phases of a single determination of the total volume. For example, it may be advantageous to apply one mode of determination of the repetition rate and the summing of the incremental volumes during the commencement and termination phases, that is while the repetition rate is changing markedly, and another mode during the intermediate phase. The transition from one mode to the other is suitably controlled by the microprocessor in dependence on, for example, the repetition rate and/or its variation with time.

I claim as my invention:

1. A method of volumetrically measuring a fluid stream in a conduit, which comprises causing the fluid stream to move a follower element cyclically past at least one sensing point at a frequency proportional to the volume flow rate of the fluid stream, producing passage signals in response to the follower element passing the sensing point, detecting the passage signals, and determining the total volume of the fluid that flows past a measuring point along the stream during a measuring period using the repetition rate of the detected passage signals as a parameter, wherein the improvement comprises continually measuring the passage signal repetition rate throughout the measuring period, determining from stored data representing the volume of fluid flowing past the measuring point per passage signal—said volume being herein termed the incremental volume—as a function of the repetition rate the incremental volume associated with each detected passage signal, and summing the incremental volumes associated with the passage signals detected during the measuring period.

2. A method according to claim 1 in which the step of continually measuring the passage signal repetition rate throughout the measuring period is carried out using an average value of the time separating two consecutive passage signals as calculated in each instance over a period comprising a predetermined number of the immediately preceding consecutive signals.

3. A device for volumetrically measuring a fluid stream in a conduit, comprising a housing defining a flow-through compartment having a closed-loop guide track for a follower element and an inlet and an outlet adapted to be connected to the conduit conveying the fluid stream to be measured, a follower element disposed in the flow-through compartment and adapted to be circulated around the guide track by the fluid stream at a speed proportional to the volume flow rate of the fluid stream, sensing means producing a series of passage signals in response to the follower element cyclically passing at least one sensing point along the guide track during its circulation, and means for determining the total volume of fluid that flows through the flow-through compartment during a measuring period using the repetition rate of the passage signals as a parameter, said total volume determining means including means for continually measuring the passage signal repetition rate throughout the measuring period, a memory storing data representing the volume of fluid flowing through the flow-through compartment per passage signal—said volume being herein termed the incremental volume—as a function of the passage signal repetition rate, means for determining from said stored data the incremental volume associated with each passage signal, and means for summing the incremental volumes associated with the passage signals produced during the measuring period.

4. A device according to claim 3 in which the means for continually measuring the passage signal repetition rate throughout the measuring period include means for determining the average time separating consecutive passage signals as calculated over a period comprising in each instance a predetermined number of the immediately preceding consecutive passage signals.

* * * * *